(12) United States Patent
Baskaran et al.

(10) Patent No.: US 11,910,184 B2
(45) Date of Patent: Feb. 20, 2024

(54) METHOD FOR ESTABLISHING A SECURE CONNECTION BETWEEN A UE AND A NETWORK, A USER EQUIPMENT AND A COMMUNICATION SYSTEM

(71) Applicant: NEC Corporation, Tokyo (JP)

(72) Inventors: Sheeba Backia Mary Baskaran, Tamil Nadu (IN); Sander De Kievit, Tokyo (JP); Sivabalan Arumugam, Tamil Nadu (IN); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 17/422,035

(22) PCT Filed: Jan. 10, 2020

(86) PCT No.: PCT/JP2020/000724
§ 371 (c)(1),
(2) Date: Jul. 9, 2021

(87) PCT Pub. No.: WO2020/149240
PCT Pub. Date: Jul. 23, 2020

(65) Prior Publication Data
US 2022/0104009 A1 Mar. 31, 2022

(30) Foreign Application Priority Data
Jan. 18, 2019 (IN) .............................. 201911002286

(51) Int. Cl.
*H04W 12/02* (2009.01)
*H04W 12/72* (2021.01)
(Continued)

(52) U.S. Cl.
CPC ............. *H04W 12/02* (2013.01); *H04W 8/04* (2013.01); *H04W 8/18* (2013.01); *H04W 12/06* (2013.01); *H04W 12/72* (2021.01); *H04W 60/00* (2013.01)

(58) Field of Classification Search
CPC ......... H04W 12/02; H04W 8/04; H04W 8/18; H04W 12/06; H04W 12/72; H04W 60/00; H04W 48/12; H04W 8/26
See application file for complete search history.

(56) References Cited

U.S. PATENT DOCUMENTS

2017/0012833 A1* 1/2017 Kumar ................ H04L 41/5019
2019/0149521 A1* 5/2019 Jerichow ............... H04L 9/3226
713/171

OTHER PUBLICATIONS

"3rd Generation Partnership Project; Technical Specification Group Services and System Aspects; Study on enhancement of 5GS for Vertical and LAN Services (Release 16)", 3GPP Standard; Technical Report; 3GPP TR 23.734, No. V16.0.0, Dec. 19, 2018 (Dec. 19, 2018), pp. 1-107 (Year: 2018).*

(Continued)

*Primary Examiner* — Brandon J Miller
(74) *Attorney, Agent, or Firm* — Sughrue Mion, PLLC

(57) ABSTRACT

The present disclosure provides a User Equipment (UE) comprising a transceiver circuit; and a controller configured to control the transceiver circuit to send, to an Access and mobility Management Function (AMF) of a communication node, an identifier, wherein upon successful authentication of a network access function of the UE in the communication node, the controller is configured to maintain a secure connection with the communication node.

11 Claims, 17 Drawing Sheets

(51) Int. Cl.
  *H04W 8/04*     (2009.01)
  *H04W 8/18*     (2009.01)
  *H04W 12/06*    (2021.01)
  *H04W 60/00*    (2009.01)

(56) References Cited

OTHER PUBLICATIONS

Huawei et al: "Supporting the Non-Public Network as a set of slices", 3GPP Draft; S2-1812355 Supporting the Non-Public Network as a Set of Slices, vol. SA WG2, No. West Palm Beach, Florida, the US; NOv. 26, 2018-Nov. 30, 2018 Nov. 20, 2018 (Nov. 20, 2018), pp. 4-5 (Year: 2018).*

Ericsson: "Introducing support for Non-Public Networks", 3GPP Draft; S2-1900122_VLAN-23501-MERGED, vol. SA WG@2, No. Kochi, India; Jan. 21, 2019-Jan. 25, 2019 Jan. 15, 2019 (Jan. 15, 2019), XP051594903 D5 NEC: "NF discovery with SUCI", 3GPP Draft; S3-182862_NF Discovery With SUCI, vol. SA WG3, p. 7 (Year: 2019).*

International Search Report for PCT Application No. PCT/JP2020/000724, dated Feb. 26, 2019.

3rd Generation Partnership Project, "Technical Specification Group Services and System Aspects; Service requirements for the 5G system; Stage 1 (Release 16)", 3GPP TS 22.261 V16.6.0, Dec. 2018.

3rd Generation Partnership Project, "Technical Specification Group Services and System Aspects; Security architecture and procedures for 5G system (Release 15)", 3GPP TS 33.501 V15.3.1, Dec. 2018, pp. 1-182.

3rd Generation Partnership Project, "Technical Specification Group Core Network and Terminals; Numbering, addressing and identification (Release 15)", 3GPP TS 23.003 V15.6.0, Dec. 2018, pp. 1-130.

3rd Generation Partnership Project, "Technical Specification Group Services and System Aspects; Study on enhancement of 5GS for Vertical and LAN Services (Release 16)" , 3GPP TR 23.734 V16.0.0, Dec. 2018, pp. 1-107.

Samsung, "Discussion: UE registration to Non-Public NW", 3GPP S2-1810584, 3GPP SA WG2 Meeting #129, Dongguan, China, Oct. 15-19, 2018, pp. 1-5.

Huawei, HiSilicon, "Supporting the Non-Public Network as a set of slices", 3GPP S2-1812355, 3GPP SA WG2 Meeting #129bis, West Palm Beach, Florida, US, Nov. 26-30, 2018.

Ericsson, "Introducing support for Non-Public Networks", 3GPP S2-1900122, 3GPP SA WG2 Meeting #130, Jan. 21-25, 2019, Kochi, India, Jan. 15, 2019, pp. 1-5.

Nec, "NF discovery with SUCI", 3GPP S3-182862, 3GPP TSG-SA WG3 Meeting #92bis, Sep. 24-28, 2018, Harbin, China, Sep. 11, 2018.

Japanese Office Action for JP Application No. 2021-540161 dated Aug. 2, 2022 with English Translation.

Qualcomm Incorporated, "TS 23.501: Introducing Non-public network", 3GPP TSG SA WG2 #130, S2-1900061, Jan. 15, 2019.

ZTE Coporation, "Authentication for IOPS", 3GPP TSG-SA WG3 #80, S3-151902, Aug. 17, 2015.

* cited by examiner

METHOD FOR ESTABLISHING A SECURE CONNECTION BETWEEN A UE AND A NETWORK, A USER EQUIPMENT AND A COMMUNICATION SYSTEM

This application is a National Stage Entry of PCT/JP2020/000724 filed on Jan. 10, 2020, which claims priority from Indian Patent Application 201911002286 filed on Jan. 18, 2019, the contents of all of which are incorporated herein by reference, in their entirety.

TECHNICAL FIELD

The present disclosure relates to a method and system to identify the non-public network (NPN) subscribers in 5G System with Public Land Mobile Network (PLMN) and NPN.

BACKGROUND ART

The 5G system supports non-public networks (NPNs) which can be both physical and virtual non-public network. Various deployment possibilities as specified by a 3rd Generation Partnership Project (3GPP) document TS 22.261 (NPL1) states that, "Specifically, they may be deployed as completely standalone networks, they may be hosted by a PLMN, or they may be offered as a slice of a PLMN". Few core requirements stated by the SA1 in TS 22.261 are, "A non-public network subscriber to access a PLMN service shall have a service subscription using 3GPP identifiers and credentials provided or accepted by a PLMN. The 5G system shall support a mechanism to prevent a user equipment (UE) with a subscription to a non-public network from automatically selecting and attaching to a PLMN or non-public network it is not authorized to select. The 5G system shall support a mechanism to prevent a UE with a subscription to a PLMN from automatically selecting and attaching to a non-public network it is not authorised to select."

CITATION LIST

Non Patent Literature

NPL 1: 3GPP document TS 22.261 V16.6.0
NPL 2: 3GPP document TS 33.501 V15.3.1
NPL 3: 3GPP document TS. 23.003 V15.6.0

SUMMARY OF INVENTION

Technical Problem

However, the current 5G system with a PLMN does not have a means to identify the UE's NPN subscription which need to be addressed to support the 5GS which provides both PLMN and NPN.

Further, in a deployment where the PLMN hosts the NPN, the PLMN could not select the right Access Management Function/Security Anchor Function (AMF/SEAF), Authentication Function (AUSF) (instances), Unified Data Management (UDM) (instances) for the NPN service as Subscription Concealed Identifier (SUCI) contains only PLMN specific information such as Mobile Country Code (MCC), Mobile Network Code (MNC), PLMN specific Routing Identifier (ID), Home Network (HN) public key ID (PLMN specific) and completely lacks "UE network subscription information". As the UE's subscription unique permanent identifier (SUPI) does not contain any information on the UE's specific network subscription (ex. for NPN), the SUCI also does not contain UE's network subscription information. In this case, the PLMN could not identify the network subscription of the UE and select the nodes specific to the hosted NPN in the PLMN. Therefore, the lack of UE's network subscription information in the SUPI/SUCI can lead to NPN UE identification and node selection failure. Additionally, the current Routing Indicator allow together with the Home Network Identifier (HN ID) to route network signaling with SUCI to AUSF and UDM instances capable to serve the subscriber. As it does not consider the UE's network subscription (ex. for NPN), the AUSF/UDM (instances) selection which is capable of serving the NPN subscriber is not possible. Because in the current system, the HNID contains only the MCC and MNC of the hosted PLMN and it does not contain any NPN specific information.

It is also considered that if the UE has a single SUPI, for both PLMN and all NPNs, it is subscribed, then it will cause privacy issues as the NPNs may get to know the UE's PLMN specific SUPI. Therefore, lack of privacy protection/Unprotected UE NPN ID in 5G System (5GS) that support PLMN and NPN service will make the 5G system vulnerable to user tracking (privacy issues), Denial of Service (DoS) and Distributed Denial of Service (DDoS) attacks respectively.

Further as provided by the 3GPP document (NPL 2), the UDM offers the Subscription identifier de-concealing function (SIDF) functionality to support privacy protection for SUPI and the UE always sends the concealed SUPI (i.e. SUCI) in the initial Non Access Stratum (NAS) message (Registration Request) to the 5G core network.

Therefore, as per the 3GPP document, the current Routing Indicator allows together with the Home Network Identifier (HN ID) to route network signaling with SUCI to AUSF and UDM instances capable to serve the subscriber. As it does not consider the UE's network subscription (ex. for NPN), the AUSF/UDM (instances) selection which is capable of serving the NPN subscriber is not possible. Because in the current system, the HNID contains only the MCC and MNC of the hosted PLMN and it does not contain any NPN specific information.

The drawback of using the deployment where the PLMN hosts the NPN, the UE's subscription identifier (SUPI) will not contain any information on the UE's specific network subscription (ex. for NPN) and hence the SUCI also will not contain UEs' network subscription information. In this case, the PLMN could not select the right AMF/SEAF, AUSF (instances), UDM (instances) for the NPN service as SUCI completely lacks "UE network subscription information".

Also, the UE's network subscription type is not included as part of the SUCI construction which need to be considered when more than one subscription (PLMN & NPN) is supported by the PLMN of the 5GS.

Therefore, there is a need to overcome the problems described above in order to provide a Network Subscription Type in the SUCI to help identify the UE's specific to the network type that it is subscribed.

In view of the problems described above, the present disclosure aims to provide a solution to solve at least one of the various problems.

Solution to Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

In order to overcome at least the problems as discussed above, in a first aspect of the present disclosure, a User Equipment (UE) is disclosed. The UE includes a transceiver circuit; and a controller configured to control the transceiver circuit to send, to an Access and mobility Management Function (AMF) of a communication node, an identifier, wherein upon successful authentication of a network access function of the UE in the communication node, the controller is configured to maintain a secure connection with the communication node.

In a second aspect of the present disclosure, a communication system which comprising a user equipment (UE), a first node, a second node and a third node is disclose. The first node is configured to receive a registration request message transmitted by the UE, verify information indicating whether the UE has a subscription for specific service by decrypting the registration request message including the information and a first identifier, and send, to the second node, an authentication request message including a second identifier upon successful verification of the information, the second node is configured to verify the second identifier, and route, to the third node, the authentication request based on a third identifier included in the first identifier, and the third node is configured to decrypt the authentication request message and transmitting a response for providing the secure connection with the UE.

In a third aspect of the present disclosure, a method for establishing a secure connection between a user equipment (UE) and a network is provided. The method includes sending, from the UE to a first node of the network, a registration request including information indicating whether the UE has a subscription for specific service, wherein the registration request includes a first identifier and the first identifier includes the information; verifying, by the first node of the network, the registration request and sending an authentication request to a second node of the network upon successful verification of the information based on a second identifier which is included in the first identifier, wherein the second identifier routes nodes of the network for the specific service, and the authentication request includes the first identifier, UE network access capability and a third identifier, wherein the third identifier identifies a specific serving network; verifying, by the second node of the network, the third identifier; sending, by the second node of the network, upon successful verification of the third identifier, an authentication data request to a third node of the network based on the second identifier; de-concealing the first identifier, by the third node of the network, to verify UE network access restriction information; and sending, by the third node of the network, upon successful verification of the de-concealed first identifier and the information, an authentication data feedback to the second node of the network including the first identifier and authentication vector for the specific service.

It is also provided that the capability for the specific service is received by the UE which is transmitted by the network and the UE is configured to select the network indicator prior to sending the registration request message. Further, the UE is also configured to calculate the first identifier by setting the network indicator bit and concealing said network indicator with a public key.

Further, as provided by the present disclosure, a registration failure message is also transmitted by the first node of the network upon failure of matching of the information against a network service access restriction.

In the present disclosure, the first node of the network is defined as an Access and Mobility Management Function (AMF), the second node of the network is defined as an Authentication Server Function (AUSF) and the third node of the network is defined as an Unified Data Management (UDM).

In the present disclosure, the information is defined as network subscription type information, the first identifier is defined as a Subscription Concealed Identifier, the second identifier is defined as a Routing ID, the third identifier is defined as a serving network ID and the specific service is defined as non-public network service.

In a fourth aspect of the present disclosure, a method for establishing a secure connection between a user equipment (UE) and a communication network is provided. The method includes sending, from a the UE to a visited Access and Mobility Function (AMF) of the network, a registration request including an information indicating whether the UE has a subscription for specific service, wherein the registration request includes a Subscription Concealed Identifier (SUCI); verifying, the registration request and the SUCI, by the visited/serving AMF, with the network access/restriction function of the UE; sending, by visited AMF, upon successful verification of the SUCI, an authentication request to a Home Authentication Server Function (AUSF) of the network based on a routing ID of the network; verifying, by the Home AUSF, an identification information for the network and routing the authentication request to a Home UDM of the network based on the routing ID in the SUCI; de-concealing the SUCI information, by the Home UDM, to verify UE network access restriction information; and generating an authentication key by the Home UDM of the network for providing a secure communication between the UE and the communication network.

In a fifth aspect of the present disclosure, a method for establishing a secure connection between a UE and a communication network is provided. The method includes sending a registration request including, SUCI, from a UE to a visited Access and Mobility Function PLMN (AMF) of the network; verifying, the SUCI, by the PLMN SEAF, with the network access/restriction function of the UE; sending, by the SEAF, upon successful verification of the SUCI, an authentication request to a Home AUSF of the network; verifying, by the Home AUSF, an identification information for the network; routing the authentication request to a Home NPN UDM of the network; de-concealing the SUCI information, by the Home NPN UDM, to verify UE network access restriction information; and generating an authentication key by the Home NPN UDM of the network for providing an encrypted communication between the UE and the communication network.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1:
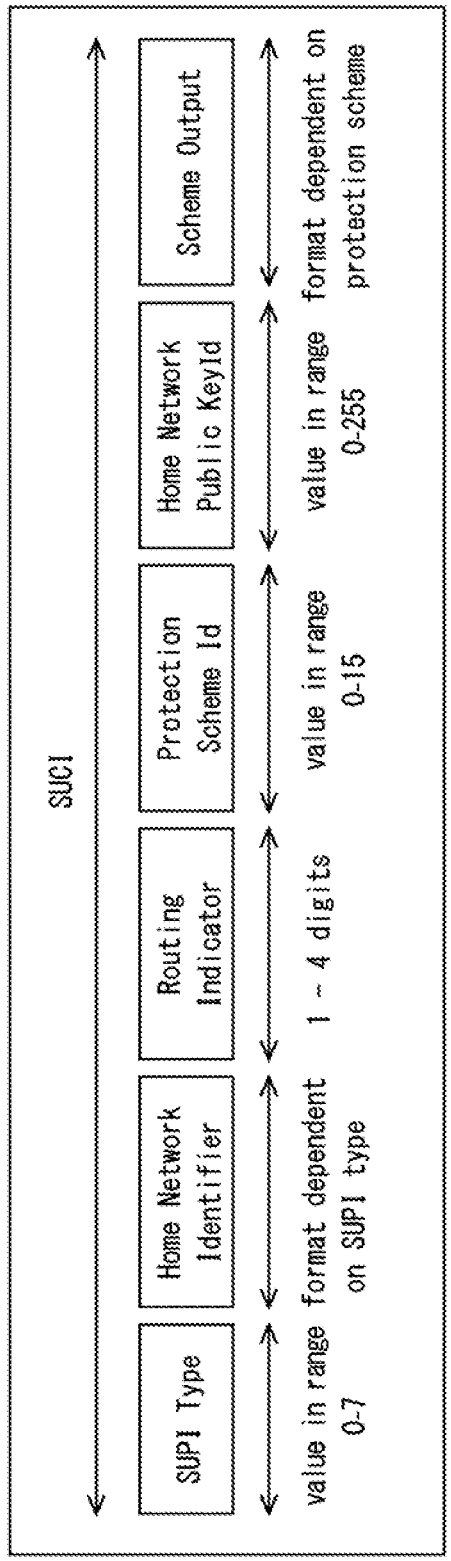
FIG. 1 illustrates SUCI construction as disclosed by the NPL 3.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

According to different embodiments of the present disclosure, it is provided that if the PLMN provides the NPN service, the MNC may denote a PLMN network, but the subscription will be for the NPN hosted by the PLMN. For NPN Deployments the NPN hosted by a PLMN is indicated as Deployment A, the NPN offered as a slice from a PLMN which is indicated as Deployment B, and Standalone NPN is indicated as Deployment C in this disclosure.

Further, for SUPI Enhancement irrespective of the forms that a SUPI takes, either International Mobile Subscription Identity (IMSI) or Network Access Identifier (NAI), the SUPI can include the information/indication specific to the User's Network Subscription such as PLMN subscription, NPN subscription etc. to identify the User or UE specific to the network it is subscribed.

It is to be noted that the inclusion of "User's Network Subscription" identification information in the SUPI can be very essential in the deployment A where the PLMN hosts the NPN. Because even though a UE is a subscriber of a 5G PLMN, it can also subscribe to the NPN hosted by the same PLMN. But the scope is not limited to Deployment A.

The SUCI can be constructed by the UE using its "Network Subscription Type" identification information and the "Network Subscription Type" can denote if the UE/User has the subscription for a PLMN (service) or for a non-public network (service).

It is to be noted that the inclusion of "User's Network Subscription" identification information in the SUCI can be very essential in the deployment A where the PLMN hosts the NPN. But the scope is not limited to Deployment A.

Further, any UE temporary identifier (ex. 5G-Global Unique Temporary Identity (GUTI)) can also contain, "Network Subscription Type" identification information or the 5G-GUTI can be specific to the UE's different subscription (NPN, PLMN etc.). A UE can have more than one 5G-GUTI with the same home network at the same time, when UE takes more than one service (PLMN and NPN)/need to access hosted NPN from the PLMN. Further, dedicated temporary identifier for each network has to be maintained by the UE similar to 5G-GUTIPLMN and 5G-GUTINPN.

In the present specification, it is to be noted that the "Network Subscription Type" can otherwise termed as the "User Subscription Type" or "Subscriber Network Type".

Further, a UE can have more than one SUPI (One for PLMN & one/more for NPN(s)). Therefore, in the identification types including deployment options A & B, the Primary SUPI is provided by the PLMN for PLMN Service, and the Secondary SUPI(s) is/are provided by the PLMN for NPN service(s). Additionally, for identification types including deployment options C, the primary SUPI is Provided by NPN for NPN Services, and the Secondary SUPI(s) is/are provided by the NPN(s) for NPN Service(s).

In SUCI construction in case a UE has more than one SUPI for example in Deployment A and B (Non-standalone NPN), it can be based on the following:

<SUPI Type> <Home Network Identifier> <Subscriber Network Type> <Routing Indicator> <Protection Scheme Id> <Home Network (PLMN/NPN) Public Key ID> <Scheme output>

<Subscriber Network Type> can indicate if the subscription belongs to the PLMN service/NPN service/any other service.

In SUCI construction in case a UE has more than one SUPI for example in Deployment C (Standalone NPN), it can be based on the following:

<SUPI Type> <Home Network Identifier> <Subscriber Network Type> <Routing Indicator> <Protection Scheme Id> <Home Network (NPN) Public Key ID> <Scheme output>

<Subscriber Network Type> can indicate that UE ID belongs to the NPN.

Figure 2:
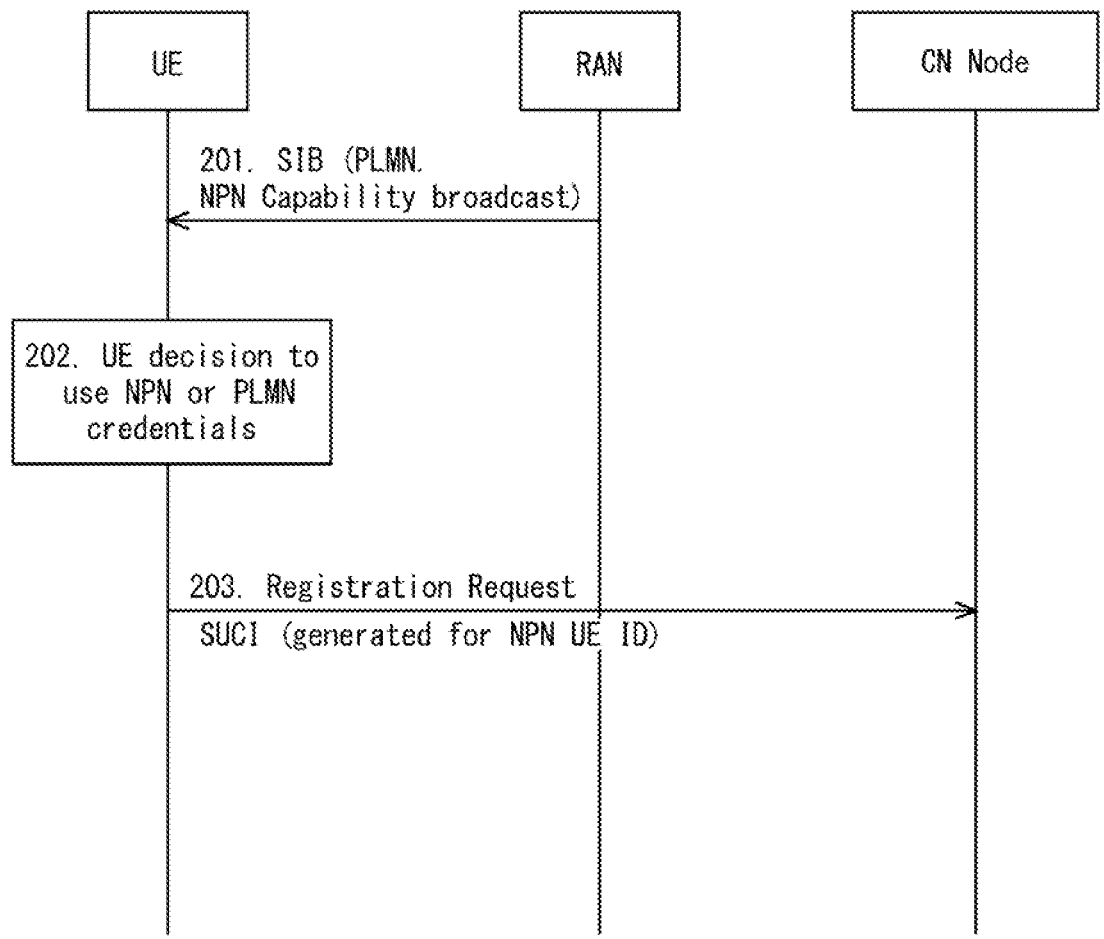
FIG. 2 illustrates a procedure of a Network NPN Support Broadcast with the present disclosure.

As disclosed in FIG. 2, a procedure of a Network NPN Support Broadcast is disclosed. At 201, the network broadcasts NPN Capability using MNC and MCC value set to 'NPN Type NW'. At 202, the UE receives broadcast and decides to use PLMN credentials (e.g. UE is roaming) or use NPN credentials (e.g. UE is non roaming). The UE calculates the SUCI as follows:

PLMN Credentials: According to NPL2, the NPN credentials SUCI calculation wherein the UE:
  sets NPN bit
  Encrypts NPN Identifier with public key
  Sets MNC and MCC to routable values (e.g. network holding the public key)

The UE can also use HN Pub Key if available and the HN UDM can also do mapping NPN Id<-> SUPI and run normal Authentication and Key Agreement (AKA) if UE is roaming. For example, NPN Identifier would be 'NPNID@NPNDomain' so that HN can route to the correct NPN or SUCI can be appended with @NPNDomain, if the domain itself is not privacy sensitive.

Figure 3:
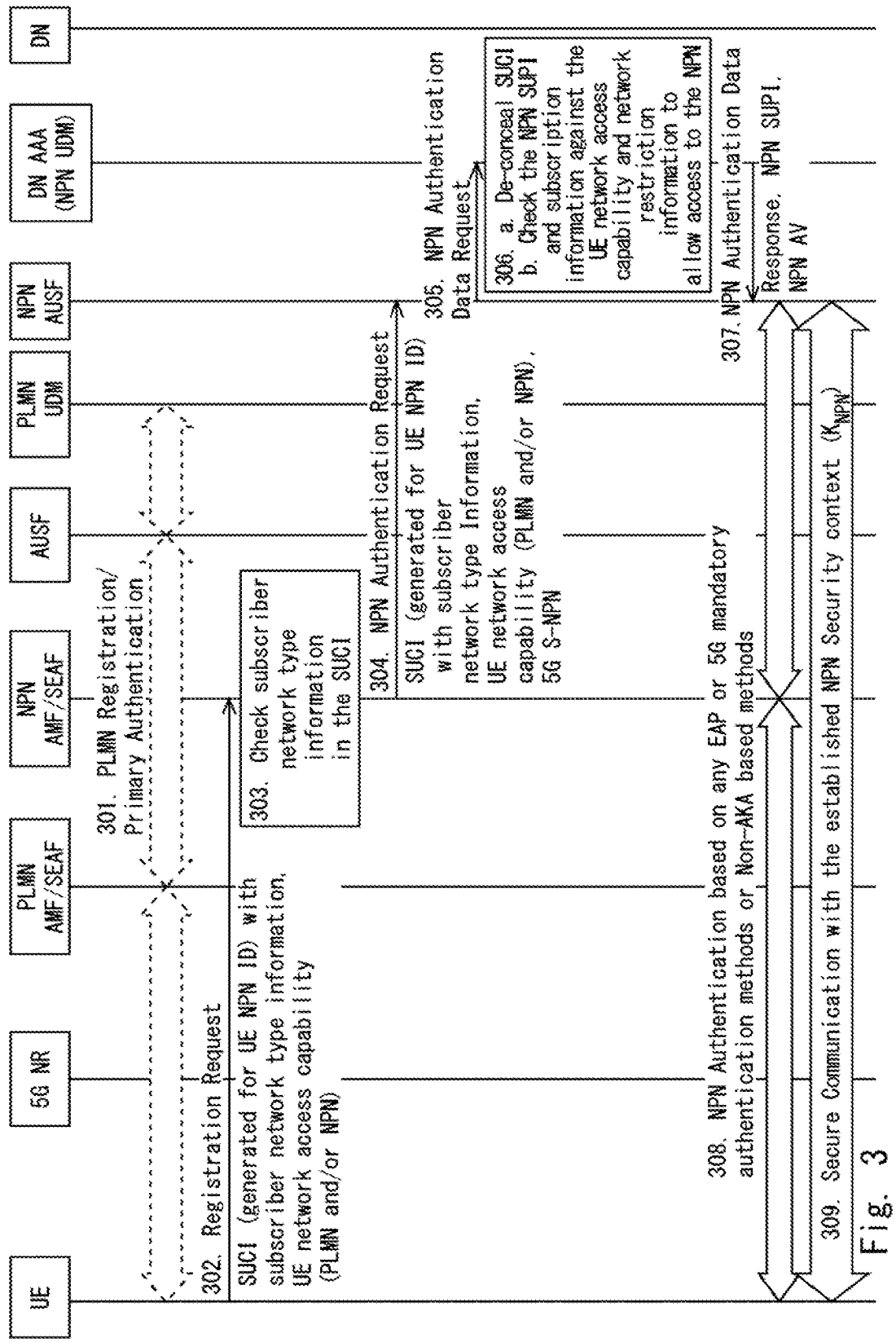
FIG. 3 illustrates a procedure of NPN SUCI handling during NPN Registration procedure according to the present disclosure.

FIG. 3 describes a method for establishing a secure connection between a UE and a network. At (301, 302), UE transmits to a first node of the network, a registration request including an information indicating the subscription of the UE for specific service. The registration request includes a first identifier and the first identifier includes the information.

At (303), the first node of the network verifies the registration request and at 304, the first node of the network sends an authentication request to a second node of the network upon successful verification of the information based on a second identifier which is included in the first identifier. The second identifier routes nodes of the network for the specific service. The authentication request includes the first identifier, UE network access capability and a third identifier. The third identifier identifies a specific serving network. At (305), the second node of the network verifies the third identifier and sends an authentication data request to a third node of the network based on the second identifier, upon successful verification of the third identifier. At (306), the third node of the network de-conceals the first identifier to verify UE network access restriction information and at (308, 309) the third node sends upon successful verification of the de-concealed first identifier and the information, an authentication data feedback to the second node of the network including the first identifier and authentication vector for the specific service.

Figure 4:
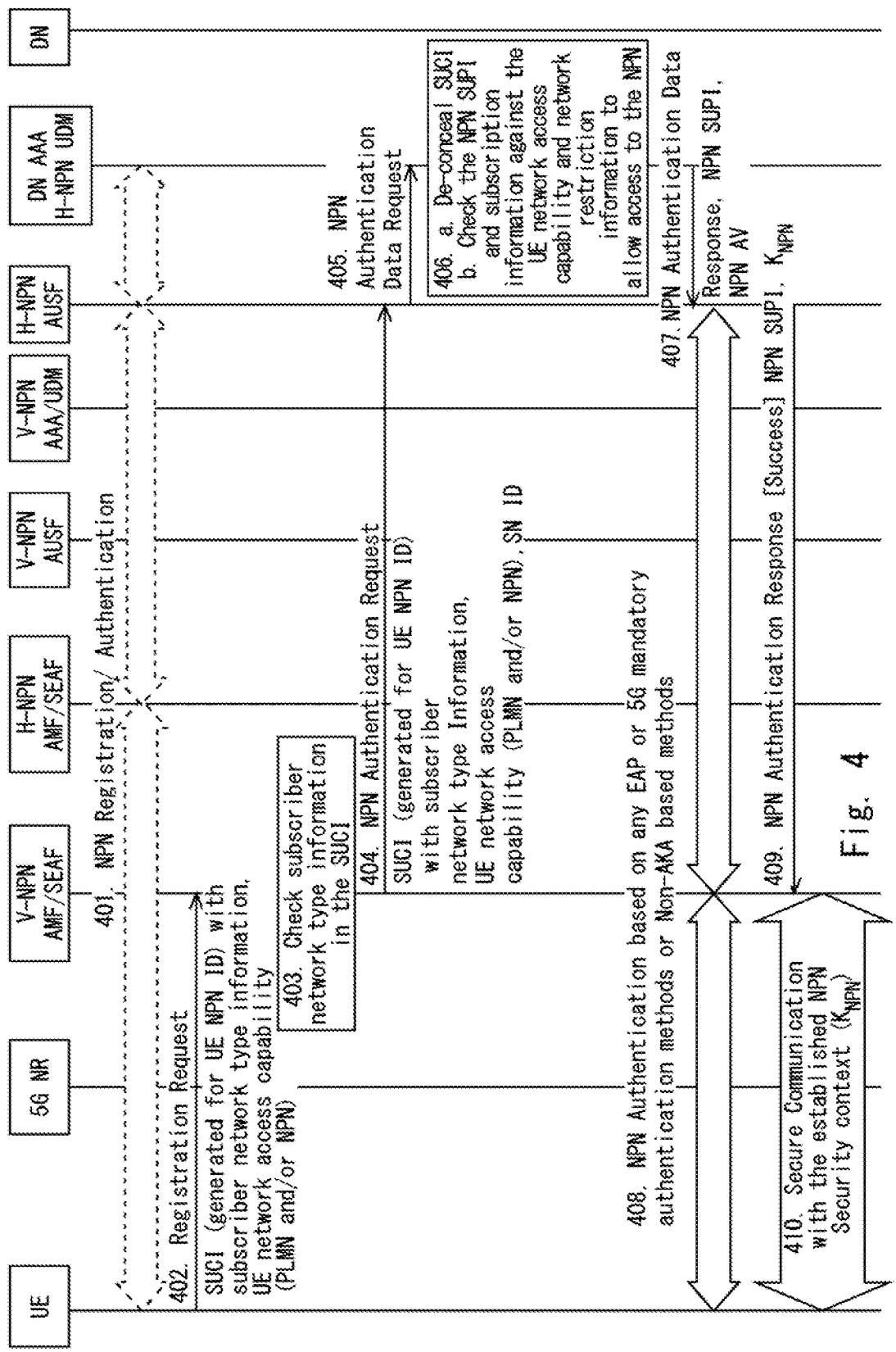
FIG. 4 illustrates another procedure of NPN SUCI handling during NPN Registration procedure according to the present disclosure.

FIG. 4 describes another method for establishing a secure connection between a UE and a network in a Roaming Case [VNPN-HNPN]. The UE may or may not be registered with the PLMN performing the primary authentication and when the UE needs NPN service, the UE identifies the NPN network from the NPN capability broadcast information sent by the 5G new radio (NR)/radio access network (RAN). At (402), the UE sends the Registration Request message to the Serving/Visited V-NPN AMF hosted by the PLMN for NPN service. The Registration Request message can contain the NPN SUCI generated from the UE NPN ID along the UE network access capability (PLMN/NPN).

At (403), the V-AMF/SEAF hosted by the PLMN verifies the subscriber network type information against its network service access restriction to check if, it can serve the NPN registration request. If the V-AMF's network service access restriction check fails, then the V-AMF sends the Registration Failure message to the UE. However, if the V-AMF's network service access restriction check succeeds, then at (404), the V-AMF/SEAF sends the NPN Authentication Request to the Home NPN AUSF (H-NPN AUSF) based on the NPN specific Routing ID in the SUCI. The NPN Authentication Request message can contain NPN SUCI, UE network access capability, and NPN specific serving network identifier (5G S-NPN ID). At (405), the Home NPN AUSF verifies the 5G S-NPN ID to check if it can request the NPN service and sends the NPN Authentication Data Request to the Home NPN UDM (H-NPN UDM) based on the NPN specific Routing ID in the NPN SUCI. At (406a), the Home NPN UDM de-conceals the NPN SUCI. At (406b), the Home NPN UDM checks the de-concealed NPN SUPI and its related subscription information against the UE network access restriction information to allow access to the NPN. If the NPN SUPI related network restriction information for NPN access is successful, then at (407), the Home NPN UDM sends the NPN Authentication data Response to the Home NPN AUSF with NPN SUPI and NPN Authentication Vector (AV). Based on the NPN AV (NPN RAND, NPN Master Key, NPN AUTN, NPN XRES) the rest of the authentication procedure at (408) is carried out. After a successful NPN authentication at (409), a $NPN_{Key}$ is agreed between the UE and the Serving NPN (Anchor function) hosted by the PLMN to secure the NPN Access Stratum (AS) and NAS communication. The NPN AS and NAS connection can be confidentiality and integrity protection based on the security context derived from the $NPN_{Key}$.

Figure 5:
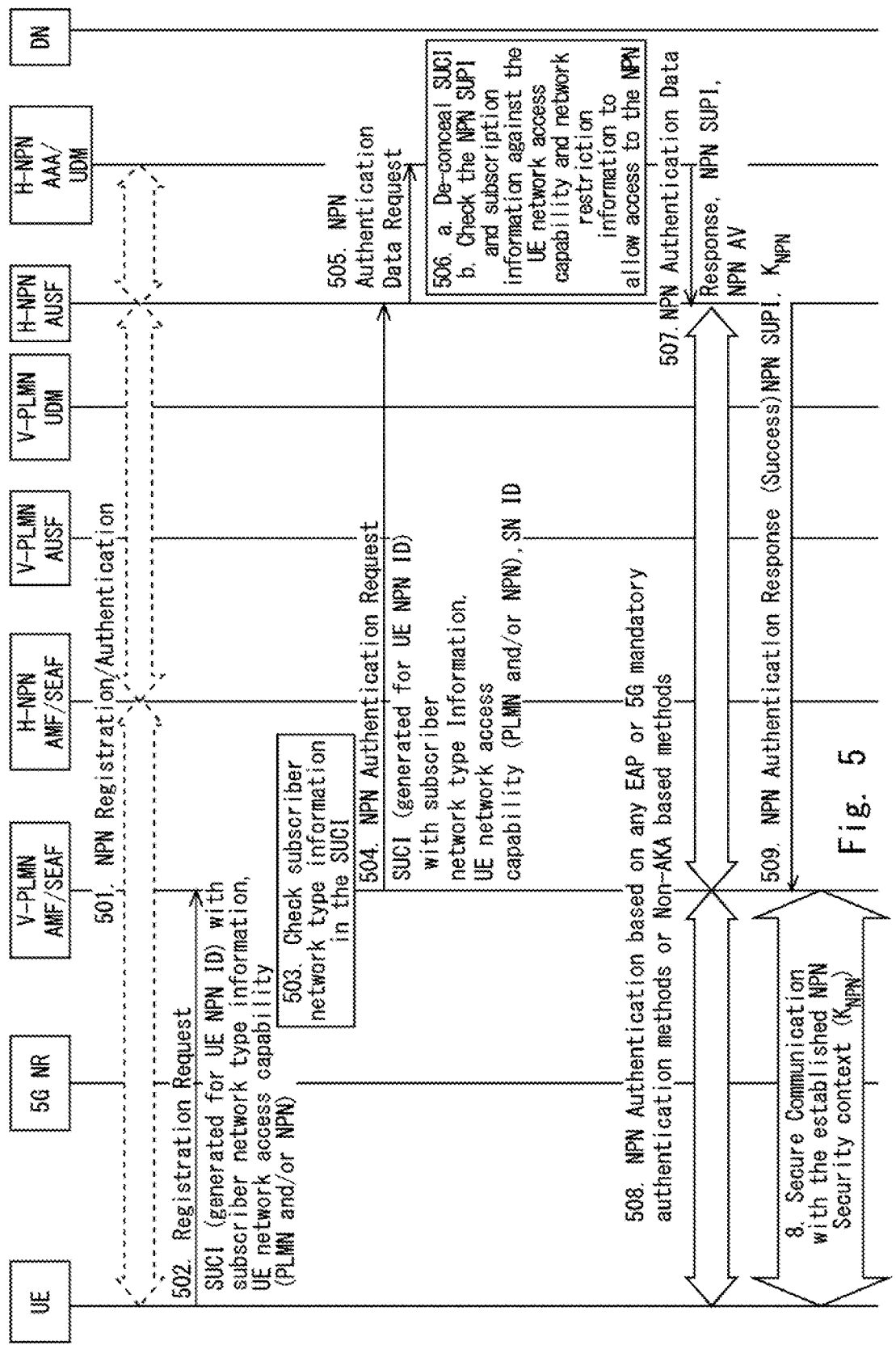
FIG. 5 illustrates another procedure of NPN SUCI handling during NPN Registration procedure according to the present disclosure.

FIG. 5 describes another method for establishing a secure connection between a UE and a network in a [VPLMN-HNPN].

The UE may or may not be registered with the PLMN performing the primary authentication. When the UE needs NPN service, at (501), the UE identifies the NPN network from the NPN capability broadcast information sent by the 5G NR/RAN. At (502), the UE sends the Registration Request message to the Serving/Visited V-PLMN AMF for NPN service hosted by the PLMN. The Registration Request message can contain the NPN SUCI generated from the UE NPN ID along the UE network access capability (PLMN/NPN). At (503), the PLMN V-AMF/SEAF (which takes care of NPN service) hosted by the PLMN verifies the subscriber network type information against its network service access restriction to check if it can serve the NPN registration request. If the V-AMF's network service access restriction check fails, then the V-AMF sends the Registration Failure message to the UE.

If the V-AMF's network service access restriction check succeeds, then at (504), the V-AMF/SEAF sends the NPN Authentication Request to the Home NPN AUSF (H-NPN AUSF) based on the NPN specific Routing ID in the SUCI. The NPN Authentication Request message can contain NPN SUCI, UE network access capability, and NPN specific serving network identifier (5G S-NPN ID). At (505), the Home NPN AUSF verifies the 5G S-NPN ID to check if it can request the NPN service and sends the NPN Authentication Data Request to the Home NPN UDM (H-NPN UDM) based on the NPN specific Routing ID in the NPN SUCI. At (506a), the Home NPN UDM de-conceals the NPN SUCI and at (506b), the Home NPN UDM checks the de-concealed NPN SUPI and its related subscription information against the UE network access restriction information to allow access to the NPN. If the NPN SUPI related network restriction information for NPN access is successful, then at (507), the Home NPN UDM sends the NPN Authentication data Response to the Home NPN AUSF with NPN SUPI and NPN AV. Based on the NPN AV (NPN RAND, NPN Master Key, NPN AUTN, NPN XRES) the rest of the authentication procedure is carried out at (508). After a successful NPN authentication, at (509), a $NPN_{Key}$ is agreed between the UE and the Serving PLMN (NPN Anchor function) hosted by the PLMN to secure the NPN AS and NAS communication. Therefore, at (510), the NPN AS and NAS connection can be confidentiality and integrity protection based on the security context derived from the $NPN_{Key}$.

Figure 6:
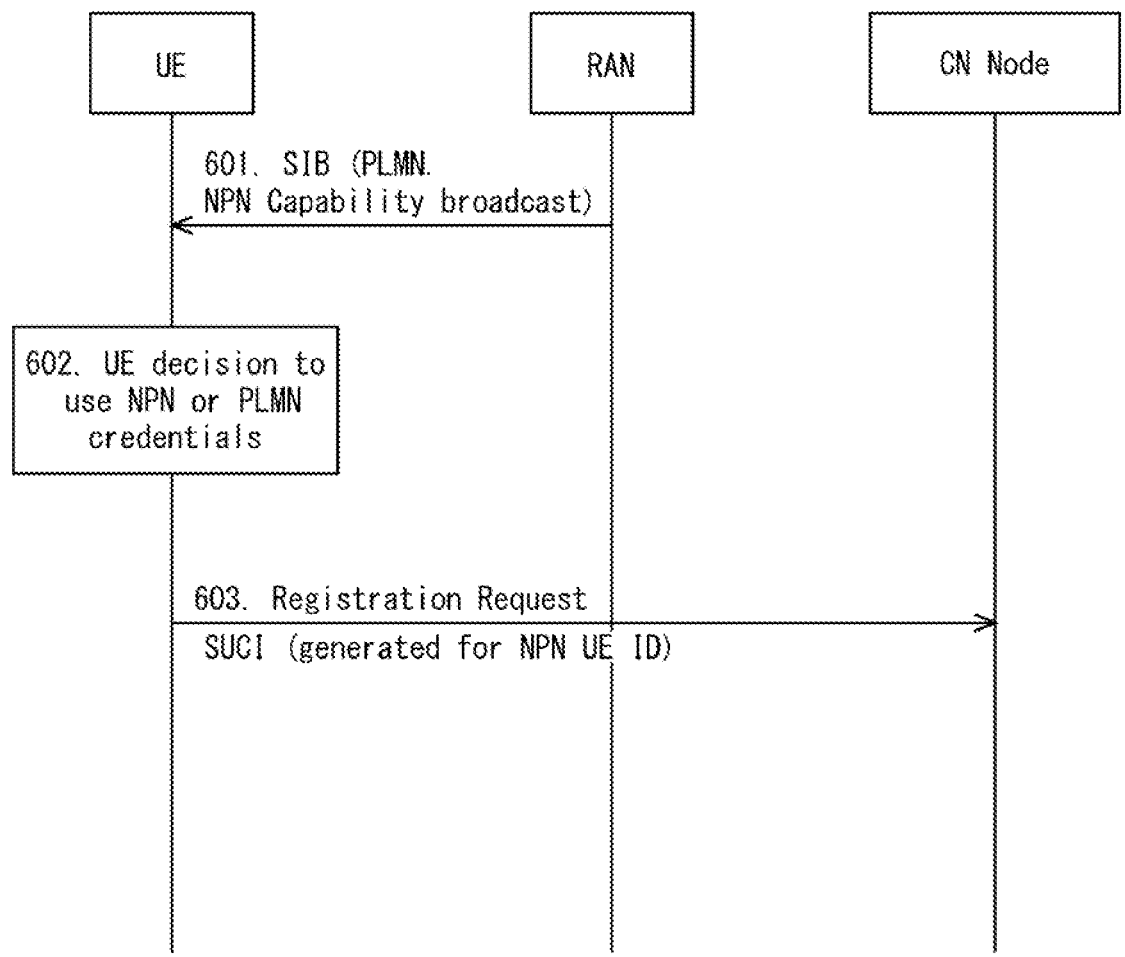
FIG. 6 illustrates another procedure of a Network NPN Support Broadcast with the present disclosure.

FIG. 6 describes deployment option B in which the NPN offered as a slice by the PLMN.

At (601), NW broadcasts NPN Slice availability and at (602), the UE receives broadcast and decides to use PLMN credentials if UE is roaming or to use NPN credentials if UE is non-roaming. Then, the UE calculates SUCI as follows:

PLMN Credentials: According to the standard as disclosed in the NPL2. Further, the NPN credentials SUCI calculation is done by the UE. The UE sets NPN bit, encrypts NPN Identifier with public key and sets MNC and MCC to routable values (e.g. network holding the public key). However, the UE could still use HN Pub Key if available and the HN UDM could do mapping NPN Id<->SUPI and run normal AKA if UE is roaming for example.

NPN Identifier would be 'NPNID@NPNDomain' for example so that HN can route to the correct NPN or SUCI can be appended with @NPNDomain, if the domain itself is not privacy sensitive.

It is to be noted that the network behavior will be same for both deployment options A and B. Hence the procedure defined for deployment A in the above section is applicable for deployment B as well.

Figure 7:
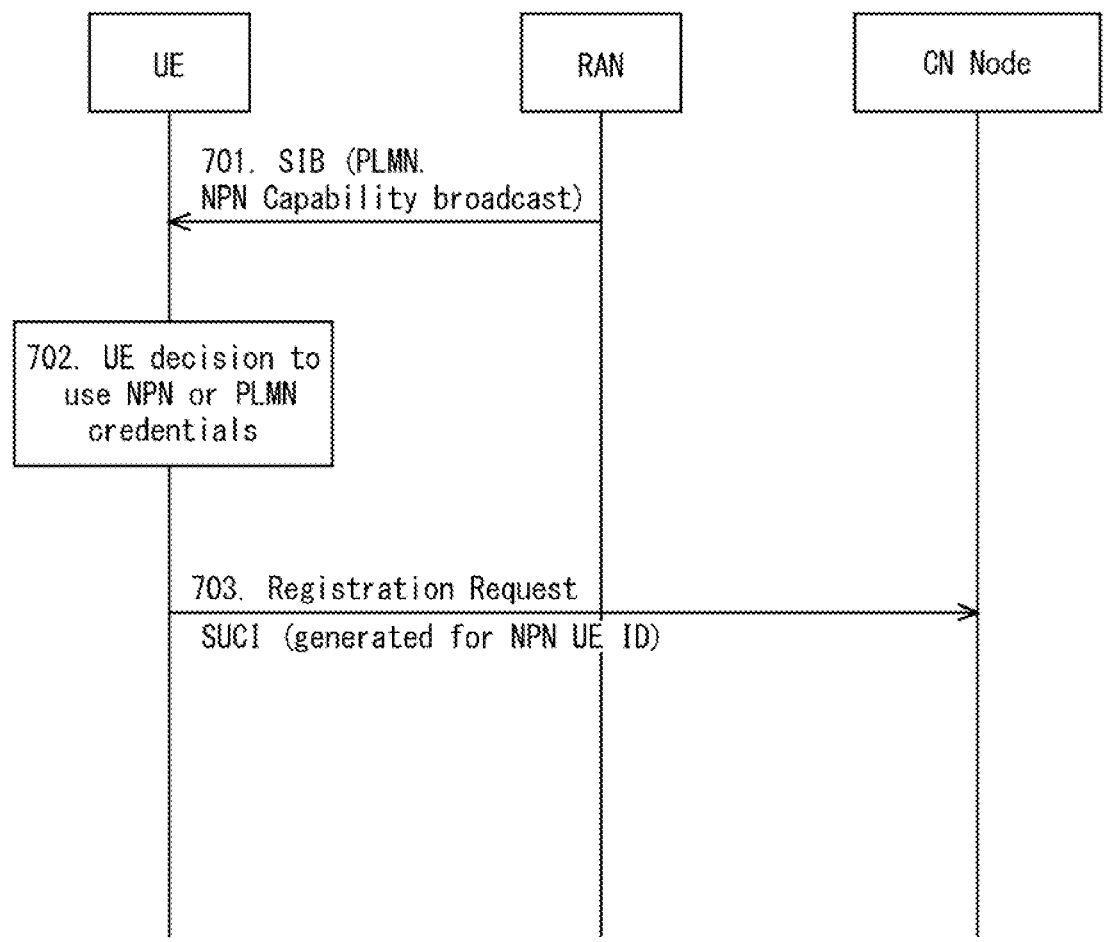
FIG. 7 illustrates another procedure of a Network NPN Support Broadcast with the present disclosure.

FIG. 7 describes deployment 'option C' as Standalone NPN.

At (701), the network broadcasts NPN Network Type (specific MCC/MNC). At (702), the UE receives broadcast and decides to use NPN credentials as operator credentials aren't useful in this case. At (702), the UE calculates SUCI by using the NPN credentials. The UE sets NPN bit and encrypts NPN Identifier with public key and thereafter sets MNC and MCC to NPN Network values. Domain is appended to SUCI after encryption.

Figure 8:
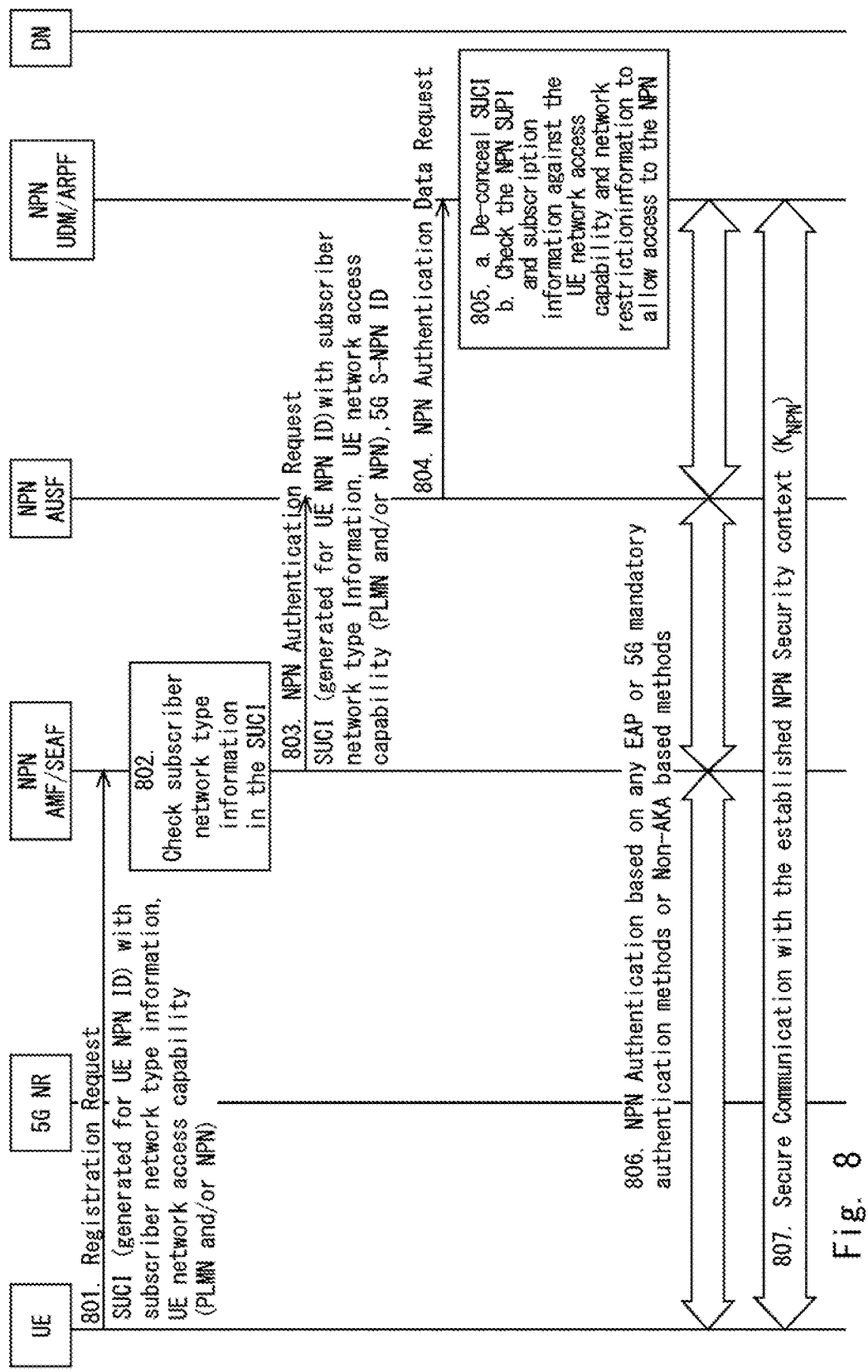
FIG. 8 illustrates another procedure of NPN SUCI handling during NPN Registration procedure according to the present disclosure.

FIG. 8 illustrates another procedure of NPN SUCI handling during NPN Registration procedure according to the present disclosure. When the UE needs NPN service, the UE identifies the NPN network from the NPN capability broadcast information sent by the 5G NR/RAN. At (801), the UE sends the Registration Request message to the NPN AMF. The Registration Request message can contain the NPN SUCI generated from the UE NPN ID along the UE network access capability (PLMN/NPN). At (802), the NPN AMF/SEAF verifies the subscriber network type information against it's network service access restriction to check if it can serve the NPN registration request. If the NPN AMF's network service access restriction check fails, then the NPN AMF sends the Registration Failure message to the UE. If the NPN AMF's network service access restriction check succeeds, the NPN AMF/SEAF, at (803), sends the NPN Authentication Request to the NPN AUSF based on the NPN specific Routing ID in the NPN SUCI. The NPN Authentication Request message can contain NPN SUCI, UE network access capability, and NPN specific serving network identifier (5G S-NPN ID). The NPN AUSF verifies the 5G S-NPN ID to check if it can request the NPN service and sends the NPN Authentication Data Request to the NPN UDM based on the NPN specific Routing ID in the NPN SUCI. At (805a), the NPN UDM de-conceals the NPN SUCI and at (805b), the NPN UDM checks the de-concealed NPN SUPI and its related subscription information against the UE network access restriction information to allow access to the NPN. If the NPN SUPI related network restriction information for NPN access is successful, then at (806), the NPN UDM sends the NPN Authentication data Response to the NPN AUSF with NPN SUPI and NPN AV.

Based on the NPN AV (NPN RAND, NPN Master Key (Derived based on pre-configured secret by the NPN), NPN AUTN, NPN XRES) the rest of the authentication procedure is carried out. After a successful NPN authentication, a $NPN_{Key}$, at (807), is agreed between the UE and NPN Anchor function to secure the NPN AS and NAS communication. The NPN AS and NAS connection can be confidentiality and integrity protection based on the security context derived from the $NPN_{Key}$.

In other embodiments of the present disclosure, the privacy Protection of UE NPN IDs is also discussed. For the NPN UE Privacy Protection, a Subscription identifier de-concealing function (SIDF) used in the current 5G system can be used to de-conceal the concealed NPN identifier (NPN SUPI) sent by the UE NPN attach request message to the network. The privacy protection applied to SUPI in the current 5G System during PLMN attach request can be used for SUPI during NPN attach request sent to either a PLMN (Non-Standalone NPN deployment) or a NPN (Standalone deployment).

Further, in Deployment A/B—Non-Standalone NPN deployment, the SIDF service can be offered by the UDM/Authentication credential Repository and Processing Function (ARPF) in the PLMN to de-conceal the UE's NPN SUCI and/or the SIDF service for a NPN can be offered by a dedicated UDM/ARPF (instance(s)) in the PLMN to de-conceal a UE's NPN SUCI. Further, the PLMN can have dedicated UDM/ARPF (instances) for all the NPNs hosted on it/deployed in it and in Deployment C—Standalone deployment, the SIDF service can be offered by the NPN UDM/Authentication, Authorization and Accounting (AAA) server to de-conceal the NPN SUCI.

Further, the HN Key usage, in Deployment A/B, the Home Network (HN) public key used in the NPN SUCI construction can be provided by the PLMN separately for the NPN SUPI privacy and/or the HN public key provided by the PLMN can be used for both PLMN and NPN SUPI privacy whereas in deployment C, a NPN will provide a NPN public key to the UE, which will be used by the UE for the concealment of corresponding UE NPN Identifier (SUPI).

The present disclosure also provides method(s) of AUSF/UDM Selection during NPN Registration Procedure. The AUSF/UDM Routing aspects for a NPN services can involve different option such as PLMN provisioned Routing ID can used for both PLMN and NPN specific AUSF/UDM selection.

The NRF or the Network Function (NF) (AUSF/UDM) consumer can be configured with information on NPN UDM/AUSF (instance(s)) information/Group Identifier Information to support NPN UDM/AUSF selection along with the Routing ID sent by the UE.

Also, in the Network/Subscription specific Routing ID provision by the PLMN, the PLMN can provide the Network (PLMN, NPN, etc) specific Routing ID to the UE. The Network specific Routing ID includes such as Routing $ID_{NPN}$ and Routing $ID_{PLMN}$. The UE can construct the SUCI including the network specific Routing ID. The PLMN can configure the NRF or the NF (AUSF/UDM) related to the network (NPN and PLMN) specific routing information to select the appropriate AUSF and UDM which can select NPN service accordingly.

Figure 9:
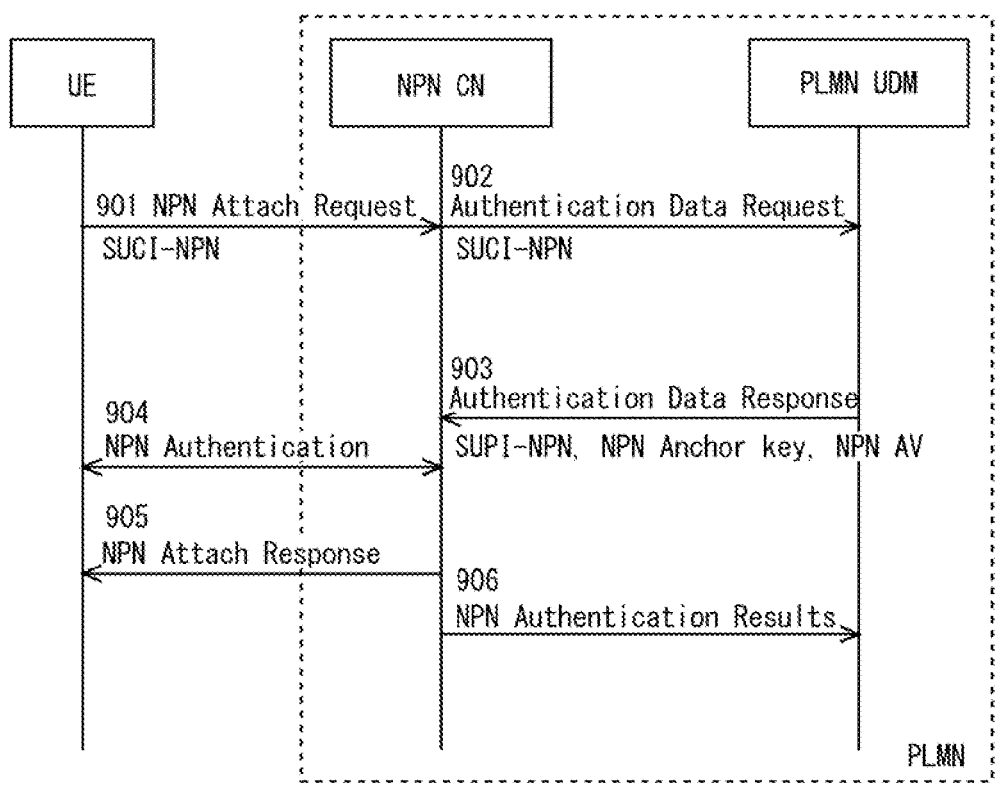
FIG. 9 illustrates a procedure of a Routing and NPN SUPI de-concealment with the present disclosure.

As per the present disclosure, different routing aspects and NPN-SUPI de-concealment during UE NPN attach procedure are also provided in which as per FIG. 9 a Routing and NPN SUPI de-concealment is provided. It is to be noted that at (901), the Routing $ID_{NPN}$ can be sent in the NPN Attach Request message from UE to a node in the NPN CN. Routing $ID_{NPN}$ should be used to route the messages from the UE to the corresponding NPN AUSF in the PLMN which hosted the NPN to perform the authentication procedure. The NPN AUSF, at (902), can route the Authentication Data Request to the preconfigured PLMN UDM instance responsible for the hosted NPN. The PLMN UDM offers the SIDF functionality to de-conceal the SUCI-NPN and sends at (903), the de-concealed SUPI-NPN to the NPN AUSF. Post authentication, the NPN AUSF, at (906), notifies the PLMN UDM/ARPF about the NPN authentication results (Success/Failure) along with NPN SUPI.

Figure 10:
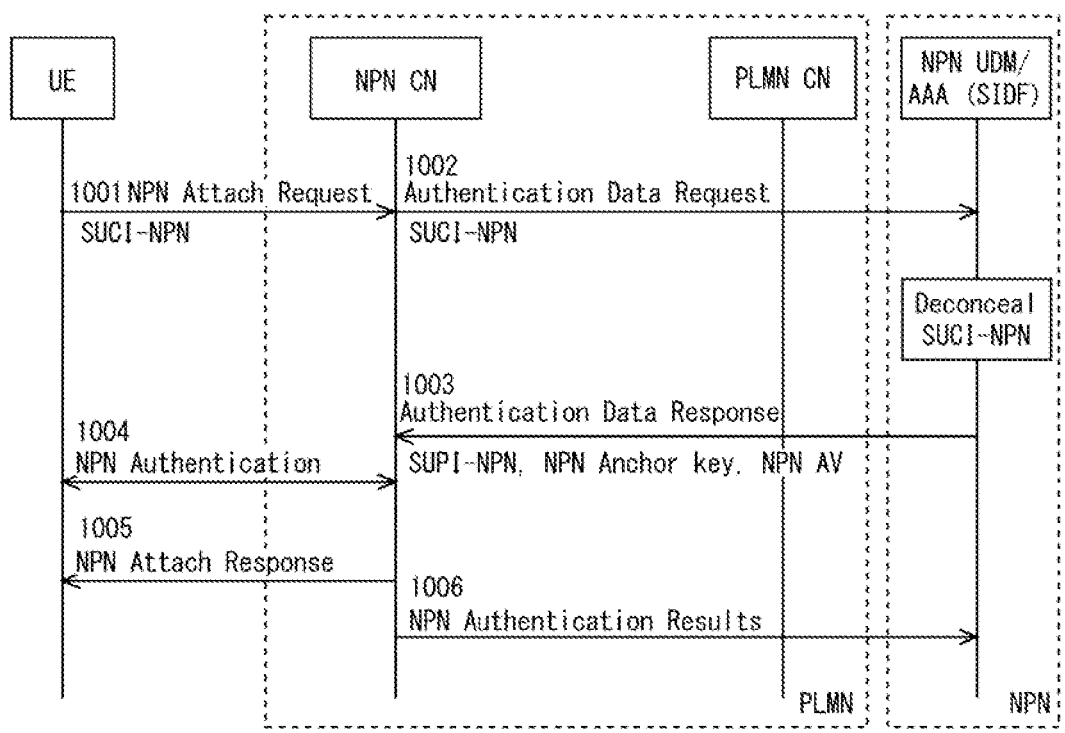
FIG. 10 illustrates another procedure of a Routing and NPN SUPI de-concealment with the present disclosure.

In another deployment A/B as per FIG. 10, Variant 2 Control by DN AAA Routing and NPN SUPI de-concealment with the present disclosure is disclosed in which Routing $ID_{NPN}$ used to route the messages from the UE to the corresponding NPN AUSF in the PLMN (PLMN hosts NPN) and the DN AAA server to perform the authentication procedure for NPN access. The NPN AUSF, at (1002), can route the Authentication Data Request to the preconfigured DN-AAA UDM instance responsible for the hosted NPN. The NPN UDM, at (1003), offers the SIDF functionality to de-conceal the SUCI-NPN and sends the de-concealed SUPI-NPN to the DN AAA. DN-AAA performs authentication. Post authentication, the NPN AUSF, at (1006), notifies the NPN UDM and DN AAA about the NPN authentication results (Success/Failure) along with NPN SUPI.

Figure 11:
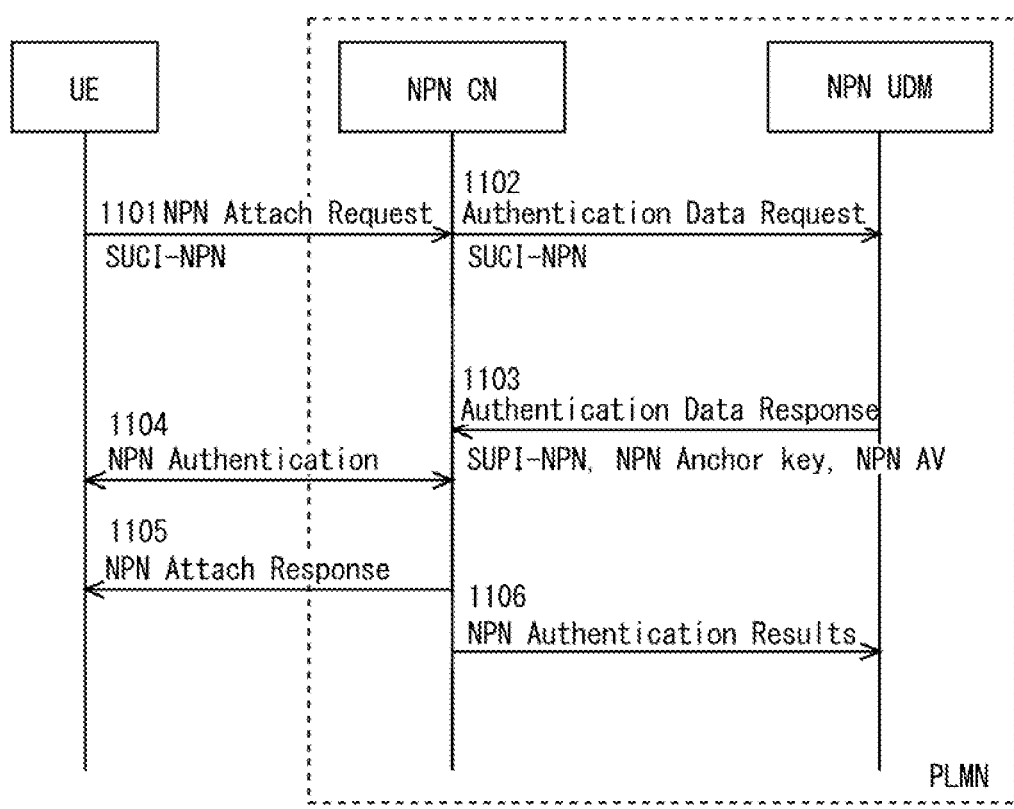
FIG. 11 illustrates another procedure of a Routing and NPN SUPI de-concealment with the present disclosure.

FIG. 11 illustrates another procedure of a Routing and NPN SUPI de-concealment with the present disclosure in which the deployment A/B—Variant 3 Control by PLMN with NPN UDM is discussed. Routing $ID_{NPN}$ can be sent in the NPN Attach Request message from UE, at (1101), to a node in the NPN CN. Routing $ID_{NPN}$ should be used to route the messages from the UE to the corresponding AUSF/UDM in the NPN (PLMN hosts NPN) to perform the authentication procedure. The NPN AUSF, at (1102), can route the Authentication Data Request to the preconfigured NPN UDM instance responsible for the hosted NPN. The NPN UDM offers the SIDF functionality to de-conceal the SUCI-NPN and sends the de-concealed SUPI-NPN to the NPN AUSF. Post authentication, at (1106), the NPN AUSF notifies the NPN UDM/ARPF about the NPN authentication results (Success/Failure) along with NPN SUPI.

Figure 12:
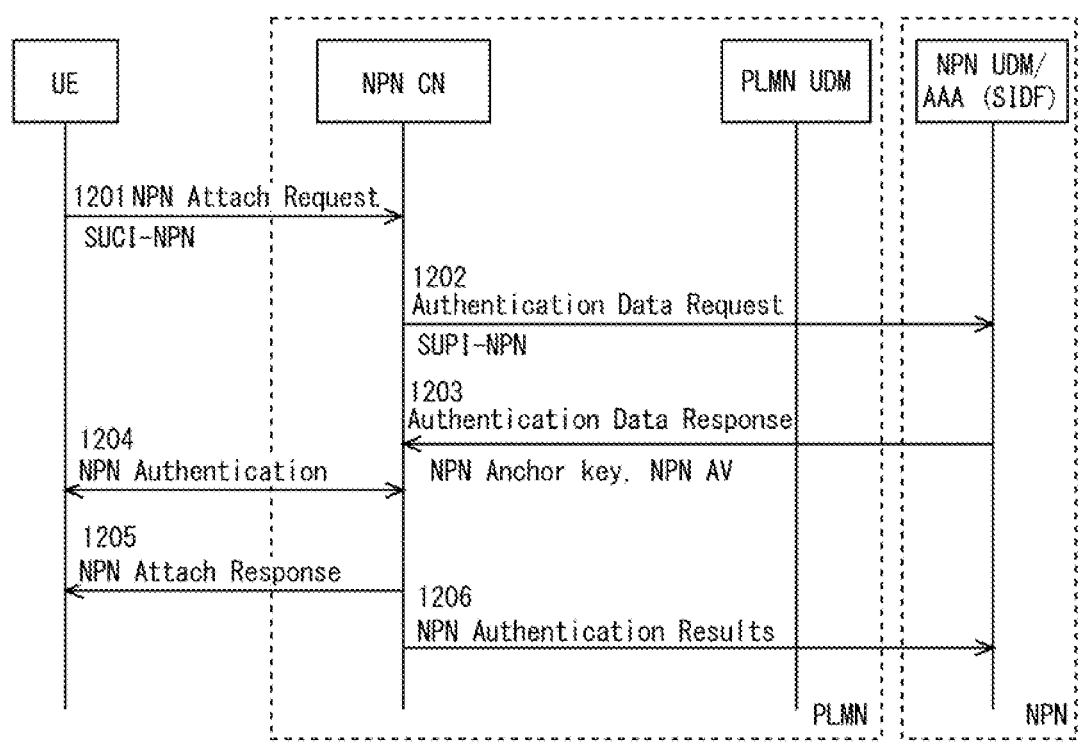
FIG. 12 illustrates another procedure of a Routing and NPN SUPI de-concealment with the present disclosure.

FIG. 12 illustrates another procedure of a Routing and NPN SUPI de-concealment with the present disclosure in which the deployment A/B—Variant 4 Control by DN AAA are discussed. In this variant, the Routing $ID_{NPN}$ used to route the messages from the UE, at (1201), to the corresponding NPN AUSF in the PLMN and the AAA server to perform the authentication procedure for NPN access. The NPN AUSF, at (1202), can route the Authentication Data Request to the preconfigured DN-AAA UDM instance responsible for the hosted NPN. The NPN UDM offers the SIDF functionality to de-conceal the SUCI-NPN and sends, at (1203), the de-concealed SUPI-NPN to the DN AAA. DN-AAA performs authentication. Post authentication, at (1206), the NPN AUSF notifies the NPN UDM and DN AAA about the NPN authentication results (Success/Failure) along with NPN SUPI.

Figure 13:
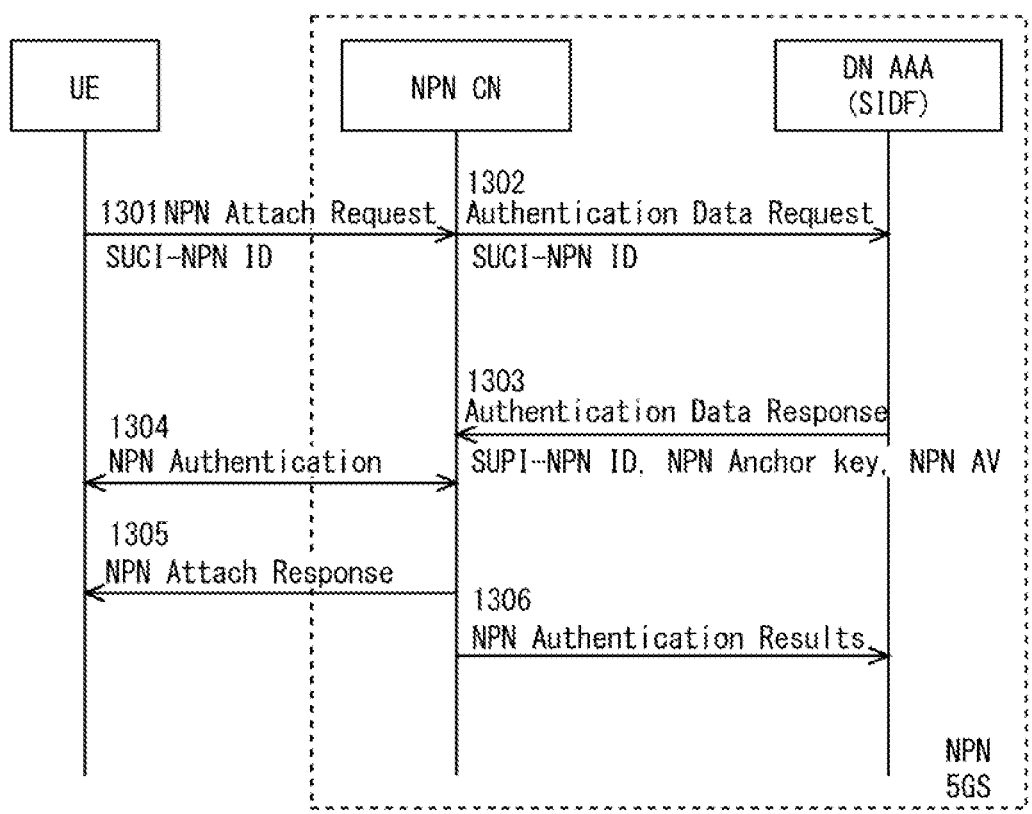
FIG. 13 illustrates another procedure of a Routing and NPN SUPI de-concealment with the present disclosure.

FIG. 13 illustrates another procedure of a Routing and NPN SUPI de-concealment with the present disclosure in which the deployment C—Standalone NPN (Option-1) is discussed. In this variant, the Routing $ID_{NPN}$ should be used to route the messages from the UE, at (1301), to the corresponding NPN core network nodes/authentication server nodes such as AAA server in the NPN to perform the authentication procedure for NPN access. NPN AV can contain NPN specific security context such as $RAND_{NPN}$, NPN AUTN, NPN ID and NPN XRES. All security context derived for a NPN should include NPN Identifier while deriving the security context. The NPN UE ID and NPN ID can used in NPN Anchor key derivation.

Figure 14:
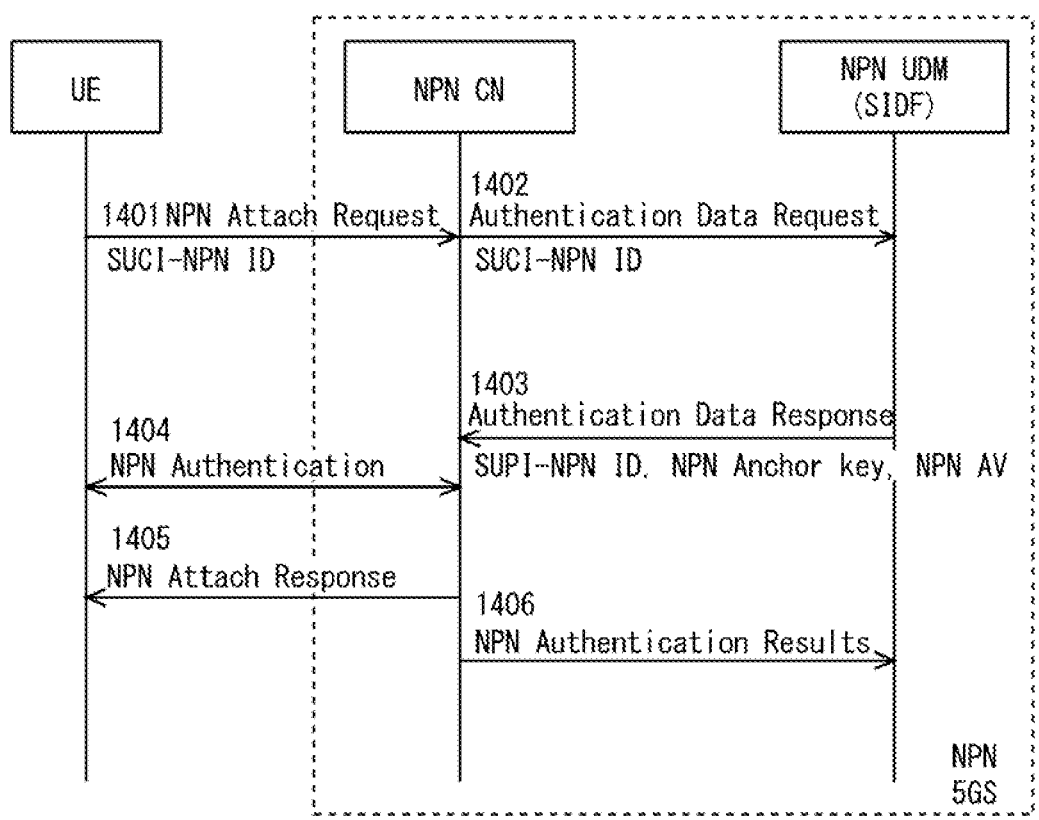
FIG. 14 illustrates another procedure of a Routing and NPN SUPI de-concealment with the present disclosure.

FIG. 14 illustrates another procedure of a Routing and NPN SUPI de-concealment with the present disclosure in which the deployment C—Standalone NPN is discussed. In this variant, the routing IDNPN used to route the messages from the UE, at (1401), to the corresponding NPN core network nodes/authentication server (ex. NPN UDM/ARPF) in the NPN to perform the authentication procedure for NPN access. The UE's NPN SUCI (SUCI-NPN ID) sent by the UE in the attach request and forwarded by the NPN AUSF, at (1402), to the NPN UDM in Authentication Data Request can be de-concealed by the NPN UDM using it's SIDF and generates NPN AV. The NPN UDM sends, at (1403), the de-concealed NPN SUPI along with the NPN AV to the NPN AUSF in the authentication data response. The NPN UDM NPN AV can contain NPN specific security context such as RANDNPN, NPN AUTN, NPN ID and NPN XRES. After a successful authentication, all security context derived for a NPN should include NPN Identifier while deriving the security context. The NPN UE ID and NPN ID can be used in NPN Anchor key derivation.

Figure 15:
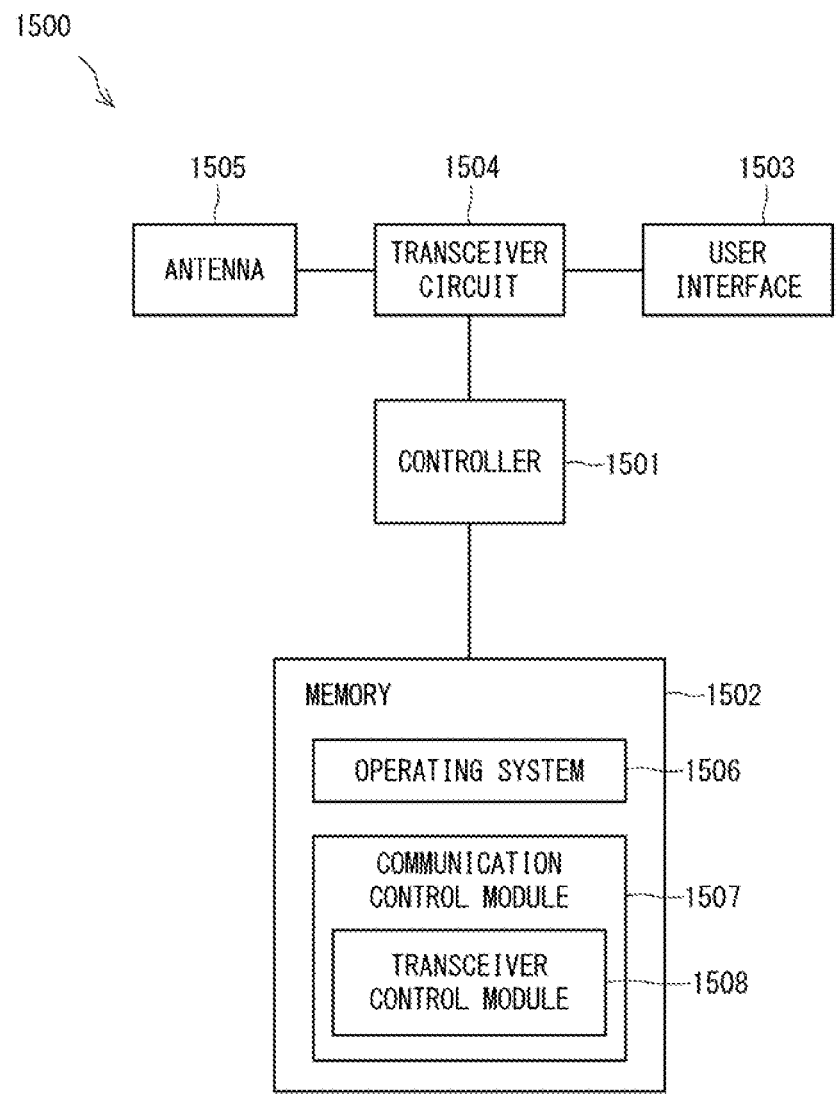
FIG. 15 illustrates a block diagram of the User Equipment (UE) with the present disclosure.

FIG. 15 illustrates a block diagram of the User Equipment (UE) (1500). As shown, the UE includes a transceiver circuit (1504), which is operable to transmit signals to and to receive signals from the connected node(s) via one or more antenna (1505). Although not necessarily shown in FIG. 15, the UE will of course have all the usual functionality of a conventional mobile device (such as a user interface) and this may be provided by any one or any combination of hardware, software and firmware, as appropriate. Software may be pre-installed in the memory (1502) and/or may be downloaded via the telecommunication network or from a removable data storage device (RMD), for example.

A controller (1501) controls the operation of the UE (1500) in accordance with software stored in a memory (1506). For example, the controller (1501) may be realized by Central Processing Unit (CPU). The software includes, among other things, an operating system (1506) and a communication control module (1507) having at least a transceiver control module (1508). The communication control module (1507) (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

Figure 16:
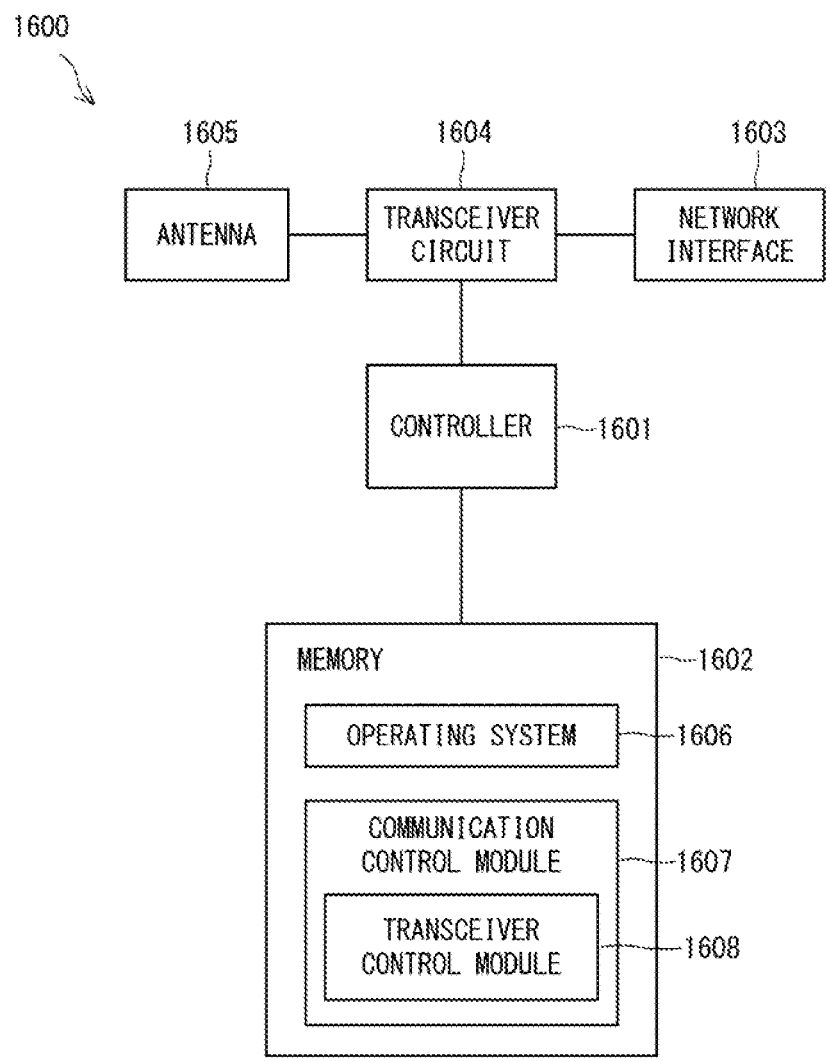
FIG. 16 illustrates a block diagram of the R(AN) node with the present disclosure.

FIG. 16 illustrates a block diagram of the R(AN) node (1600) for example a base station ('eNB' in LTE, 'gNB' in 5G). As shown, the (R)AN node (1600) includes a transceiver circuit (1604) which is operable to transmit signals to and to receive signals from connected UE(s) via one or more antenna (1605) and to transmit signals to and to receive signals from other network nodes (either directly or indirectly) via a network interface (1603). A controller (1601) controls the operation of the (R)AN node in accordance with software stored in a memory (1602). For example, the controller (1601) may be realized by Central Processing Unit (CPU). Software may be pre-installed in the memory (1602) and/or may be downloaded via the telecommunication network or from a removable data storage device (RMD), for example. The software includes, among other things, an operating system (1606) and a communication control module (1607) having at least a transceiver control module (1608).

The communication control module (1607) (using its transceiver control sub-module) is responsible for handling (generating/sending/receiving) signalling between the (R)AN node and other nodes, such as the UE, the MME, the AMF(e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller (1601), is also configured (by software or hardware) to handle related tasks such as, when implemented, UE mobility estimate and/or moving trajectory estimation.

Figure 17:
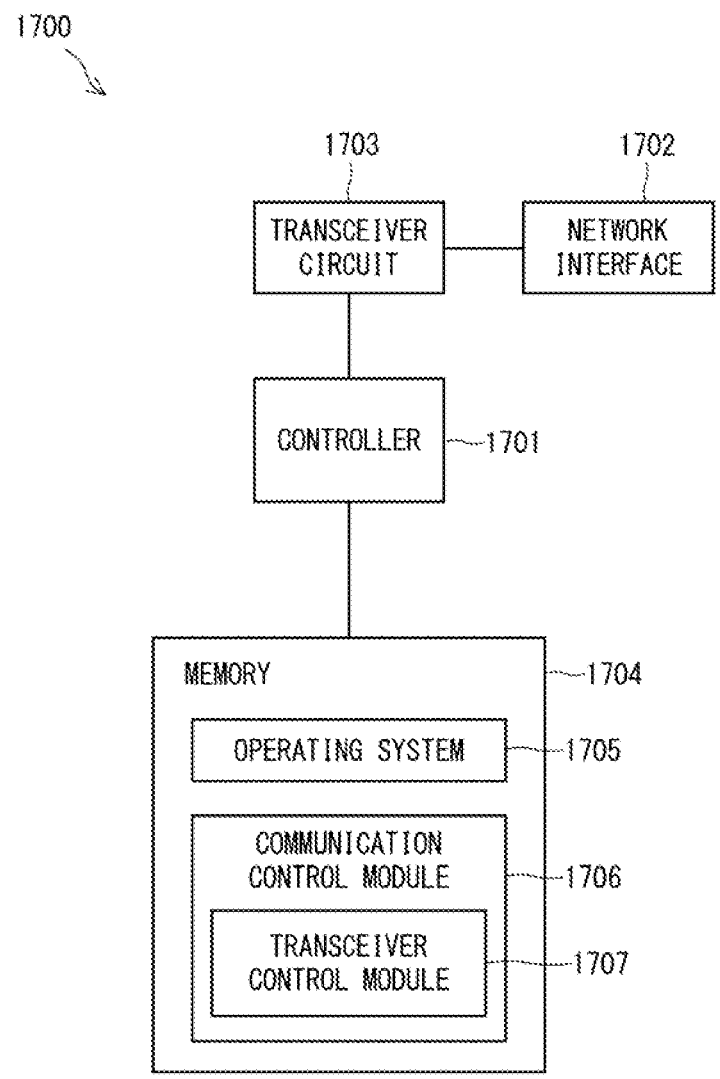
FIG. 17 illustrates a block diagram of the core network node with the present disclosure.

FIG. 17 illustrates the main components of an exemplary core network (CN) node (1700), for example an AMF, a SEAF, an AUSF, an UDM, a SIDF, an ARPF, a DN AAA server or any other core network node. The AMF may alternative to the SEAF. The UDM may alternative to the SIDF, the ARPF or the DN AAA server. The core network node (1700) is included in the 5G core network (5GC). As shown, the core network node (1700) includes a transceiver circuit (1703) which is operable to transmit signals to and to receive signals from other nodes (including the UE) via a network interface (1702). A controller (1701) controls the operation of the core network node in accordance with software stored in a memory (1704). For example, the controller (1701) may be realized by Central Processing Unit (CPU). Software may be pre-installed in the memory (1704) and/or may be downloaded via the telecommunication network or from a removable data storage device (RMD), for example. The software includes, among other things, an operating system (1705) and a communication control module (1706) having at least a transceiver control module (1707).

The communication control module (1706) (using its transceiver control sub-module) is responsible for handling (generating/sending/receiving) signalling between the core network node and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table as provided by 3GPP TS 22.368 V13.1.0 are:

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook | the contents of which are incorporated herein by reference. This list is not exhaustive and is intended to be indicative of some examples of machine-type communication applications.

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

For example, the whole or part of the above aspects can be described as, but not limited to, the following supplementary notes.

(Supplementary Note 1)
A User Equipment (UE) comprising:
a transceiver circuit; and
a controller configured to control the transceiver circuit to:
send, to an Access and mobility Management Function (AMF) of a communication node, an identifier,
wherein upon successful authentication of a network access function of the UE in the communication node, the controller is configured to maintain a secure connection with the communication node.

(Supplementary Note 2)
The method according to Supplementary Note 1,
wherein the identifier includes information indicating whether the UE has a subscription for specific service, and
wherein the controller configured to control the transceiver circuit to receive the specific service which is transmitted by a network.

(Supplementary Note 3)
The method according to Supplementary Note 2, wherein the information is network subscription type information.

(Supplementary Note 4)
The method according to Supplementary Note 2 or 3, wherein the specific service is non-public network service.

(Supplementary Note 5)
The method according to any one of Supplementary Notes 1 to 4, wherein the controller is configured to select a network indicator prior to sending a registration request message including the identifier.

(Supplementary Note 6)
The method according to Supplementary Note 5, wherein the controller is configured to determine the first identifier by setting the network indicator bit and concealing said network indicator with a public key.

(Supplementary Note 7)
The method according to any one of Supplementary Notes 1 to 6, wherein the identifier is a Subscription Concealed Identifier (SUCI).

(Supplementary Note 8)
A communication system which comprising a user equipment (UE) comprising, a first node, a second node and a third node,
wherein the first node is configured to receive a registration request message transmitted by the UE, verify information indicating whether the UE has a subscription for specific service by decrypting the registration request message including the information and a first identifier, and send, to the second node, an authentication request message including a second identifier upon successful verification of the information,
wherein the second node is configured to verify the second identifier, and route, to the third node, the authentication request based on a third identifier included in the first identifier, and
wherein the third node is configured to decrypt the authentication request message and transmitting a response for providing the secure connection with the UE.

(Supplementary Note 9)
The communication system according to Supplementary Note 8, wherein the first node is further configured to transmit a registration failure message upon failure of matching of the information against a network service access restriction.

(Supplementary Note 10)
The communication system according to Supplementary Note 8 or 9, wherein the first node is an Access and Mobility Management Function (AMF).

(Supplementary Note 11)
The communication system according to any one of Supplementary Notes 8 to 10, wherein the second node is an Authentication Server Function (AUSF).

(Supplementary Note 12)
The communication system according to any one of Supplementary Notes 8 to 11, wherein the third node is a Unified Data Management (UDM).

(Supplementary Note 13)
The communication system according to any one of Supplementary Notes 8 to 12, wherein the information is network subscription type information.

(Supplementary Note 14)
The communication system according to any one of Supplementary Notes 8 to 13, wherein the first identifier is a Subscription Concealed Identifier (SUCI).

(Supplementary Note 15)
The communication system according to any one of Supplementary Notes 8 to 14, wherein the second identifier is a Routing ID.

(Supplementary Note 16)
The communication system according to any one of Supplementary Notes 8 to 15, wherein the third identifier is a serving network ID.

(Supplementary Note 17)
The communication system according to any one of Supplementary Notes 8 to 16, wherein the specific service is non-public network service.

(Supplementary Note 18)
A method for establishing a secure connection between a user equipment (UE) and a network, comprising:
sending, from the UE to a first node of the network, a registration request including information indicating whether the UE has a subscription for specific service, wherein the registration request includes a first identifier and the first identifier includes the information;
verifying, by the first node of the network, the registration request and sending an authentication request to a second node of the network upon successful verification of the information based on a second identifier which is included in the first identifier, wherein the second identifier routes nodes of the network for the specific service, and the authentication request includes the first identifier, UE network access capability and a third identifier, wherein the third identifier identifies a specific serving network;
verifying, by the second node of the network, the third identifier;
sending, by the second node of the network, upon successful verification of the third identifier, an authentication data request to a third node of the network based on the second identifier;
de-concealing the first identifier, by the third node of the network, to verify UE network access restriction information; and
sending, by the third node of the network, upon successful verification of the de-concealed first identifier and the information, an authentication data feedback to the second node of the network including the first identifier and authentication vector for the specific service.

(Supplementary Note 19)
A method for establishing a secure connection between a user equipment (UE) and a communication network comprising:
sending, from the UE to a visited Access and Mobility Function (AMF) of the network, a registration request including an information indicating whether the UE has a subscription for specific service, wherein the registration request includes a Subscription Concealed Identifier (SUCI);
verifying, the registration request and the SUCI, by the visited/serving AMF, with the network access/restriction function of the UE;
sending, by visited AMF, upon successful verification of the SUCI, an authentication request to a Home Authentication Server Function (AUSF) of the network based on a routing ID of the network;
verifying, by the Home AUSF, an identification information for the network and routing the authentication request to a Home UDM of the network based on the routing ID in the SUCI;
de-concealing the SUCI information, by the Home UDM, to verify UE network access restriction information; and
generating an authentication key by the Home UDM of the network for providing a secure communication between the UE and the communication network.

(Supplementary Note 20)
A method for establishing a secure connection between a UE and a communication network comprising:
sending a registration request including SUCI, from a UE to a visited Access and Mobility Function PLMN (AMF) of the network;
verifying, the SUCI, by the PLMN SEAF, with the network access/restriction function of the UE;
sending, by the SEAF, upon successful verification of the SUCI, an authentication request to a Home AUSF of the network;
verifying, by the Home AUSF, an identification information for the network;
routing the authentication request to a Home NPN UDM of the network;
de-concealing the SUCI information, by the Home NPN UDM, to verify UE network access restriction information; and
generating an authentication key by the Home NPN UDM of the network for providing an encrypted communication between the UE and the communication network.

This application is based upon and claims the benefit of priority from Indian patent applications No. 201911002286, filed on Jan. 18, 2019, the disclosure of which is incorporated herein in its entirety by reference.

REFERENCE SIGNS LIST

1500 UE
1501, 1601, 1701 CONTROLLER
1502, 1602, 1704 MEMORY
1503 USER INTERFACE
1504, 1604 TRANSCEIVER CIRCUIT
1505, 1605 ANTENNA
1506, 1606, 1705 OPERATING SYSTEM
1507, 1607, 1706 COMMUNICATION CONTROL MODULE
1508, 1608, 1703, 1707 TRANSCEIVER CONTROL MODULE
1600 (R)AN NODE
1603, 1702 NETWORK INTERFACE
1700 CORE NETWORK NODE

What is claimed is:
1. A communication system comprising:
a user equipment (UE);
a first node;
a second node; and
a third node,
wherein the first node is configured to:
receive a registration request transmitted by the UE, including information indicating whether the UE has a subscription for specific service, wherein the registration request includes a first identifier, and the first identifier includes the information;
verify the registration request, and
send an authentication request to the second node of the network including a second identifier upon successful verification of the information based on a second identifier which is included in the first identifier,
wherein the second identifier routes nodes of the network for the specific service, and the authentication request includes the first identifier, UE network access capability and a third identifier, wherein the third identifier identifies a specific serving network;
wherein the second node of the network is configured to:
verify the third identifier, and
send, to the third node, upon successful verification of the third identifier, an authentication data request based on the second identifier, and
wherein the third node is configured to:
de-conceal the first identifier to verify UE network access restriction information;
send upon successful verification of the de-concealed first identifier and the information, an authentication data feedback to the second node of the network including the first identifier and authentication vector for the specific service.

2. The communication system according to claim 1, wherein the first node is further configured to transmit a registration failure message upon failure of matching of the information against a network service access restriction.

3. The communication system according to claim 1, wherein the first node is an Access and Mobility Management Function (AMF).

4. The communication system according to claim 1, wherein the second node is an Authentication Server Function (AUSF).

5. The communication system according to claim 1, wherein the third node is a Unified Data Management (UDM).

6. The communication system according to claim 1, wherein the information is network subscription type information.

7. The communication system according to claim 1, wherein the first identifier is a Subscription Concealed Identifier (SUCI).

8. The communication system according to claim 1, wherein the second identifier is a Routing ID.

9. The communication system according to claim 1, wherein the third identifier is a serving network ID.

10. The communication system according to claim 1, wherein the specific service is non-public network service.

11. A method for establishing a secure connection between a user equipment (UE) and a network, the method comprising:
sending, from the UE to a first node of the network, a registration request including information indicating whether the UE has a subscription for specific service, wherein the registration request includes a first identifier, and the first identifier includes the information;
verifying, by the first node of the network, the registration request;
sending an authentication request to a second node of the network upon successful verification of the information based on a second identifier which is included in the first identifier, wherein the second identifier routes nodes of the network for the specific service, and the authentication request includes the first identifier, UE network access capability and a third identifier, wherein the third identifier identifies a specific serving network;
verifying, by the second node of the network, the third identifier;
sending, by the second node of the network, upon successful verification of the third identifier, an authentication data request to a third node of the network based on the second identifier;
de-concealing the first identifier, by the third node of the network, to verify UE network access restriction information; and
sending, by the third node of the network, upon successful verification of the de-concealed first identifier and the information, an authentication data feedback to the second node of the network including the first identifier and authentication vector for the specific service.

* * * * *